RECORD ADAPTER SPINDLE

Filed Dec. 12, 1966

INVENTOR.
DOUGLAS W. SMITH
BY Brown, Jackson, Boettcher & Dienner
ATTYS.

RECORD ADAPTER SPINDLE

Filed Dec. 12, 1966

INVENTOR.
DOUGLAS W. SMITH

BY Brown, Jackson, Boettcher & Dienner

ATTYS.

RECORD ADAPTER SPINDLE

Filed Dec. 12, 1966 5 Sheets-Sheet 3

INVENTOR.
DOUGLAS W. SMITH

BY Brown, Jackson, Boettcher & Dienner

ATT'YS.

RECORD ADAPTER SPINDLE
Filed Dec. 12, 1966 5 Sheets-Sheet 4
FIG. 11
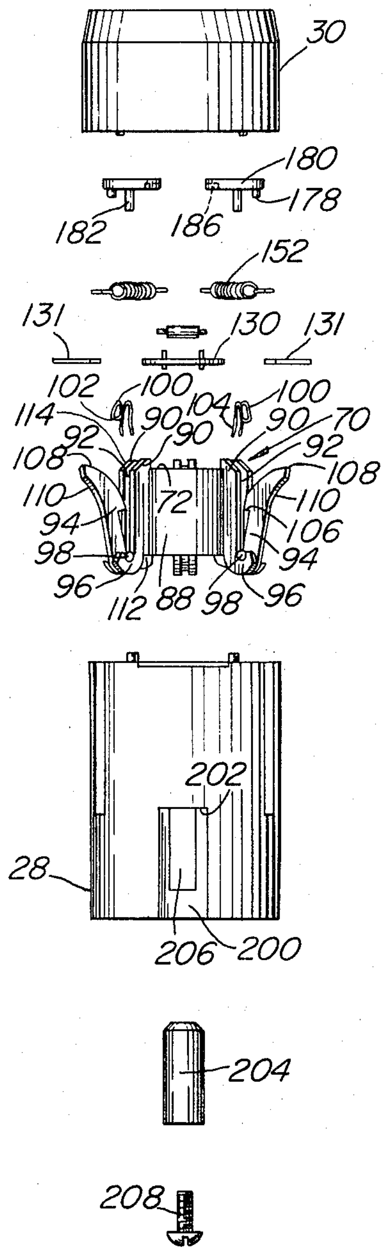
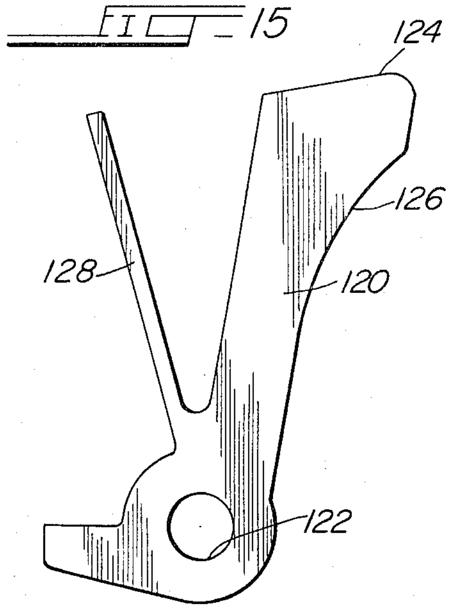
FIG. 15
FIG. 12
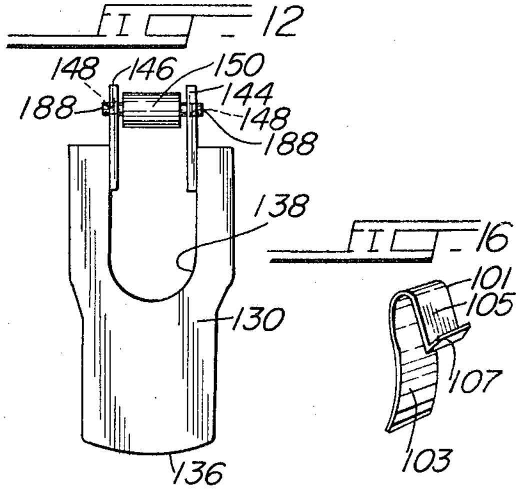
FIG. 12, FIG. 16
INVENTOR.
DOUGLAS W. SMITH
BY Brown, Jackson, Boettcher & Dienner
ATTY.

Aug. 13, 1968 D. W. SMITH 3,396,973

RECORD ADAPTER SPINDLE

Filed Dec. 12, 1966 5 Sheets-Sheet 5

INVENTOR.
DOUGLAS W. SMITH

BY

Brown, Jackson, Boettcher & Dienner

Atty.

United States Patent Office 3,396,973
Patented Aug. 13, 1968

3,396,973
RECORD ADAPTER SPINDLE

Douglas W. Smith, Benton Harbor, Mich., assignor to V-M Corporation, Benton Harbor, Mich., a corporation of Michigan Filed Dec. 12, 1966, Ser. No. 601,103
20 Claims. (Cl. 274—10)

The present invention relates to an adapter spindle for record changers and more particularly to an adapter spindle adapted to slip over a self-supporting small diameter center spindle to permit handling of records having a relatively large diameter center hole, such as the 45 r.p.m. records commonly in use today.

By "self-supporting small diameter center spindle" is meant a record changer center spindle of the type having a plurality of outwardly projecting circumferentially spaced record supporting fingers which are adapted to support a stack of small center hole records, for example, 33 r.p.m. and 78 r.p.m. records, and which include mechanism for lowering the record supporting fingers to lower the records to a turntable for playing. The record supporting fingers eliminate the need for a record support or stabilizing arm on the record changer. An example of a small diameter center spindle which has been developed for lowering small center hole records one at a time from an upper record storage portion of the spindle to a turntable without dropping the records is described in the copending application of Robert J. Hammond, Ser. No. 449,533, filed Apr. 20, 1965, and assigned to the assignee of the present invention. In the referenced small diameter center spindle, the record supporting fingers normally extend outward through vertical slots in the spindle body, with the slots extending downwardly approximately to the level of the turntable. When the supporting fingers are lowered as a unit with one record supported thereon, the record is lowered substantially the entire distance to the turntable before the supporting fingers are cammed inwardly to a retracted position to withdraw their support from the record.

It has long been known in the art to provide an adapter spindle which fits over a small diameter record changer center spindle to accommodate 45 r.p.m. records of the type having a large diameter center hole. However, such adapters have been designed for mounting over conventional offset type center spindles where records are supported on a shelf formed on the center spindle and pushed off the shelf one at a time by an ejector member to drop them to the turntable. It has also been known to provide record feeding mechanism in the adapter spindle which is actuated by the ejector of the small diameter center spindle to drop a large center hole record to the turntable. An example of the latter described adapter spindle operated by the ejector member of a small diameter center spindle is disclosed in U.S. Patent 2,918,288 to R. L. Van Antwerp, issued Dec. 22, 1959, and assigned to the assignee of the present invention.

On the other hand, it is an object of the present invention to provide an improved self-supporting adapter spindle which can be mounted on a self-supporting small diameter center spindle and includes a record supporting and controlled lowering mechanism for large center hole records which is operated by the record lowering mechanism of the center spindle.

Another object of the present invention is to provide an adapter spindle which utilizes the upward and downward movement of the record support fingers in a small diameter center spindle to effect vertical movement of primary record support fingers in the adapter spindle for lowering large center hole records to a turntable for playing.

Another object of the present invention is to provide a record adapter spindle having novel secondary record support blades which are adapted to support a stack of large center hole records on an upper storage portion of the adapter spindle while the primary record support fingers are lowering the lowermost record of the stack to a turntable for playing, the secondary record support blades being cooperatively associated with the primary record support finger mechanism to release the lowermost record when the support fingers are in their uppermost portions.

A further object of the present invention is to provide an adapter spindle having a novel record change mechanism therein which translates the vertical movement of the record support fingers in a center spindle on which the adapter spindle is mounted into horizontal motion to actaute one or more record support blades which serve to support a stack of large center hole records on an upper portion of the adapter spindle while the lowermost record of the stack is lowered to a turntable for playing.

Another object of the present invention is to provide an adapter spindle for use with a small diameter center spindle, which adapter spindle includes novel means for interconnecting a plurality of record support blades whereby movement of one of the blades to an extended record support position or to a retracted non-supporting position effects a simultaneous corresponding movement of the remaining record support blades.

Another object of the present invention is to provide an adapter spindle for use with a small diameter center spindle, which adapter spindle includes record change mechanism operable by record lowering fingers in the center spindle and a record centering roller on the lower portion of the adapter spindle for centering large center hole records disposed upon the turntable.

Another object of the present invention is to provide an adapter spindle having a novel adapter body cooperatively associated with a novel single record supporting blade to support a stack of large center hole records on the upper portion of the adapter spindle while the lowermost record of the stack is being lowered to a turntable for playing.

In one preferred embodiment of the present invention, a record adapter spindle of the self-supporting type is adapted to be mounted upon and supported by a small diameter self-supporting center spindle having retractable fingers for controlled lowering of small center hole records to a turntable for playing. The adapter spindle includes a plurality of primary record support fingers which project radially outwardly through vertical slots in the adapter spindle body to normally support a stack of large center hole records on an upper record storage portion of the adapter spindle. The primary record support fingers are operatively associated with the record support fingers of the small center spindle so as to be vertically movable therewith and serve to lower individual records to the turntable for playing. A plurality of horizontally disposed radially movable secondary record support blades are provided in the adapter spindle adjacent the lower portion of the record storage area. The secondary record support blades are movable between a release position inwardly of the adapter spindle body and a position wherein they extend outwardly of the adapter spindle body to support all but the lowermost record in the stack of large center hole records initially supported by the support fingers while the lowermost record is being lowered to the turntable. Means comprising a cam surface is provided on the primary record support finger supporting member which engages a first secondary record support blade to thereby retract it to a position within the adapter spindle body when the record support fingers are in their uppermost record supporting position. Lever crank members interconnect the first mentioned record support blade to the remaining secondary record support blades to effect simultaneoue corresponding retraction or extension of the secondary record support blades. Preferably, the lower peripheral surface portion of the adapter spindle body is tapered inwardly so as to be spaced inwardly from the peripheral edges of the center holes of records disposed on the turntable. A record centering roller is rotatably mounted adjacent the lower portion of the adapter body so as to engage the edges of the record center holes and thereby center the records on the turntable during playing.

Other objects, features and advantages of the present invention will become apparent from the following description of preferred embodiments of the invention when taken in conjunction with the accompanying drawings, in which like reference numerals designate like parts throughout the several views and where:

FIGURE 1 is an elevational view, partly in section, illustrating a preferred embodiment of a record adapter constructed in accordance with the present invention mounted in operative position over a small diameter self-supporting center spindle, the record supporting mechanism of the adapter spindle being shown in its normal at rest position supporting a stack of large center hole records on an upper storage portion of the adapter spindle;

FIGURE 2 is a top plan view of the adapter spindle illustrated in FIGURE 1, with the records removed from the adapter spindle;

FIGURE 3 is a vertical sectional view, taken substantially along the line 3—3 of FIGURE 2, illustrating the adapter spindle of the present invention mounted upon a small diameter center spindle with the adapter spindle secondary record support blades in a record supporting position and the primary record support finger mechanism at the bottom of its vertical stroke immediately after lowering a record to a turntable for playing;

FIGURE 11 is an elevational view showing the adapter spindle of FIGURE 1 in disassembled relation;

FIGURE 12 is a plan detail view of the main secondary record support blade and its associated actuating roller;

FIGURE 15 is a detail elevational view of an alternative embodiment of a primary record support finger; and FIGURE 16 is a pictorial view of an alternative embodiment of a spring for urging the record support fingers outwardly.

Figures 1, 2, 3:
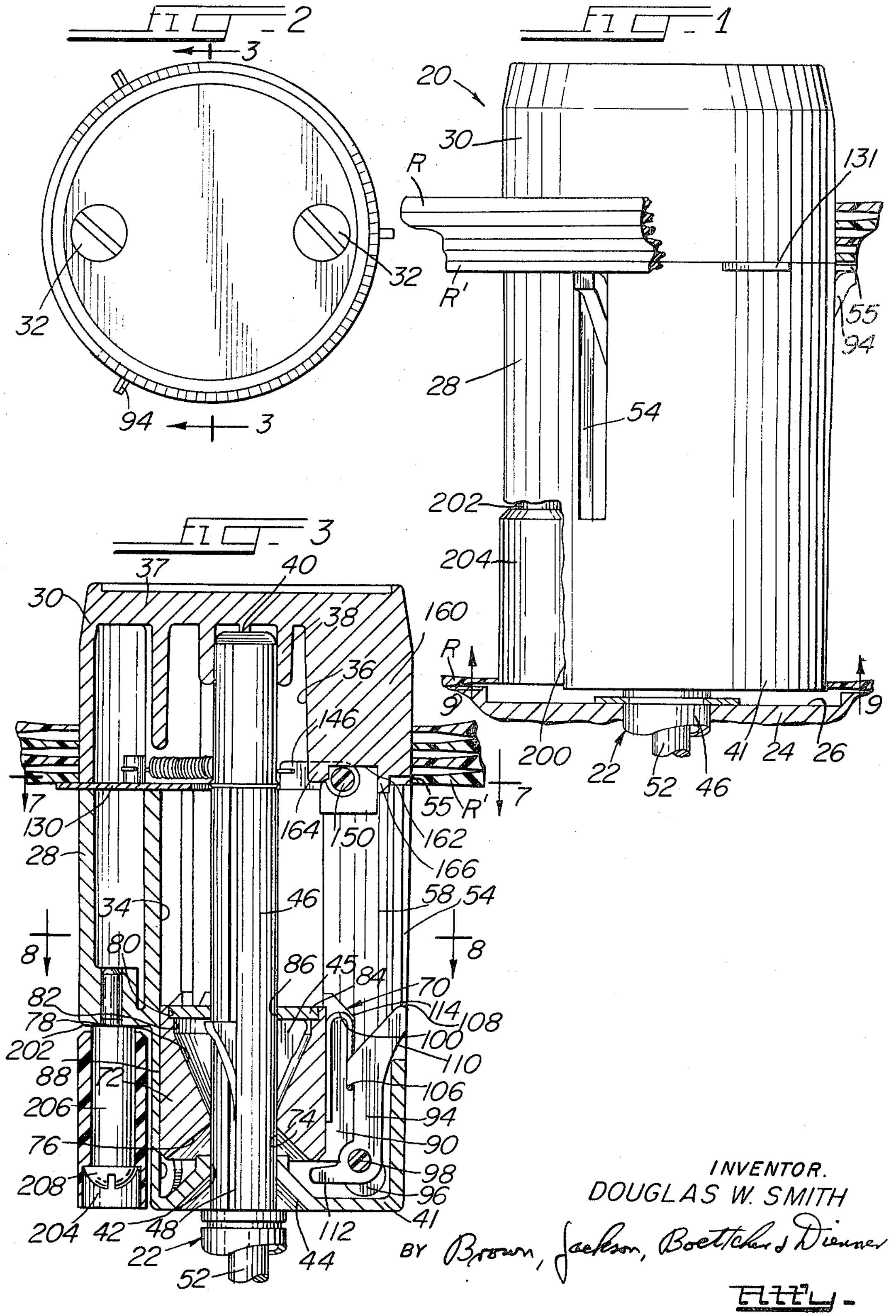

Referring now to the drawings, FIGURE 1 shows a record adapter spindle 20 mounted on a self-supporting center spindle such as shown and described in the copending application of Gerald H. Freier, Ser. No. 453,164, filed May 4, 1965, the disclosure of which is incorporated herein by reference. Said copending application is assigned to the assignee of the present invention. The center spindle body 46 of said self-supporting center spindle 22 has a plurality of circumferentially spaced vertical slots 48 formed therein through which a corresponding number of the primary record support fingers 45 project. These fingers 45 are pivotally articulated to a vertically slidable rod 52 which is operatively associated with suitable record changer structure and serve to lower the lowermost record of a stack of small diameter center hole records supported on the spindle 22 to the turntable 24 for playing. In so doing, the primary record supporting fingers 45 are disposed outwardly of the vertical slots 48 and are of sufficient width across their upper supporting surfaces to provide a solid supporting shelf which supports the lowermost one of the stack of records being lowered. A more detailed description of the self-supporting spindle 22 may be obtained by reference to the aforementioned copending application of Gerald H. Freier, and also to the application of Robert J. Hammond, Ser. No. 449,533, filed Apr. 20, 1965, now U. S. Patent 3,336,032 issued Aug. 15, 1967.

In accordance with the invention, the adapter spindle 20 includes an adapter body having a lower body portion 28 and an upper cap member 30 which may be secured to the lower body portion 28 in any suitable manner, as for example by a pair of self-threading pan head screws 32 (FIGURE 2). The adapter spindle body may be made of any suitable material such as a die cast metal.

Figures 4, 5, 6:
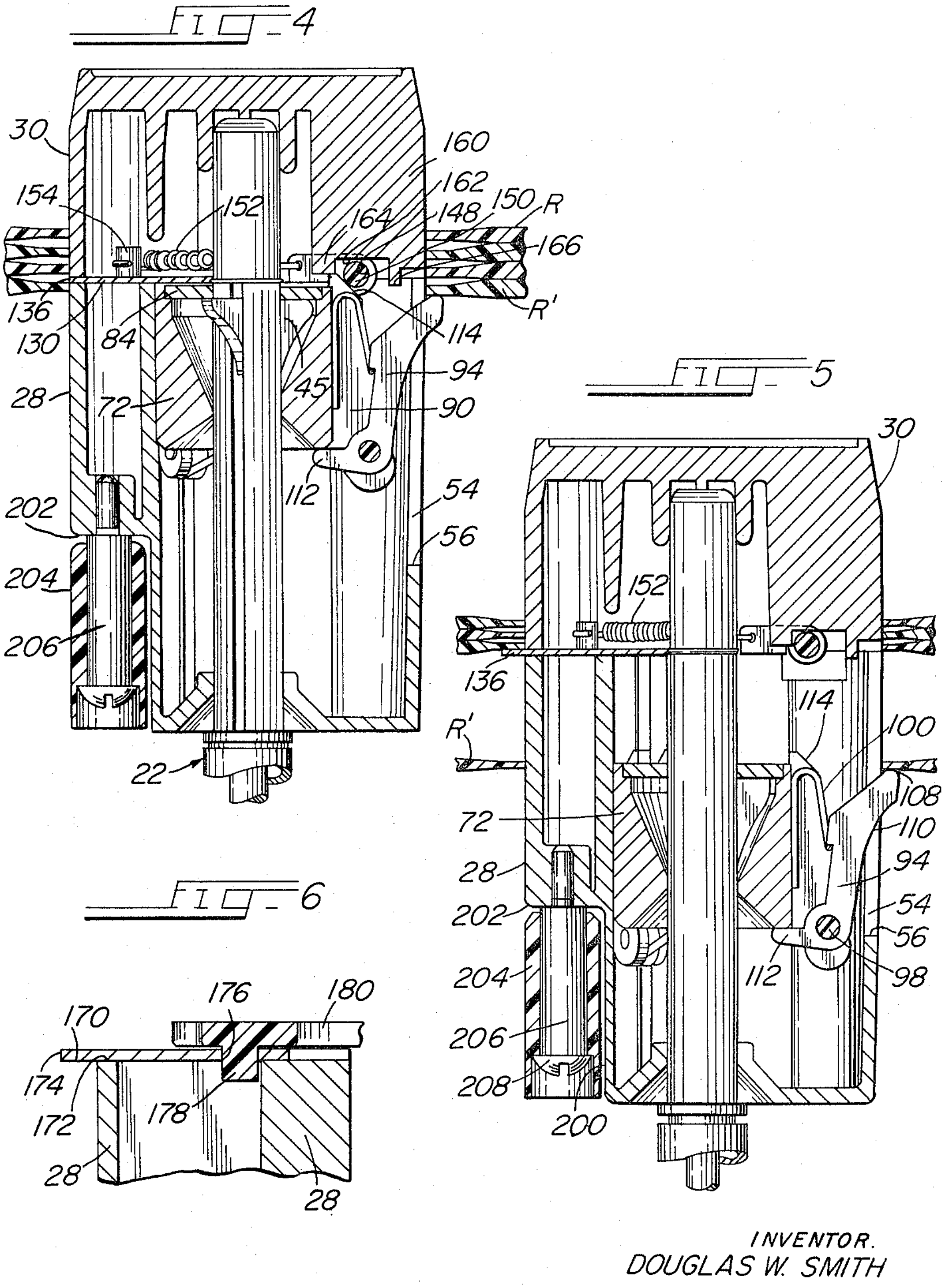
FIGURE 4 is a vertical sectional view similar to FIGURE 3, but showing the adapter spindle primary record support finger mechanism in its normal at-rest position supporting a stack of records on an upper storage portion of the spindle, with the secondary record support blades being retracted to a position within the adapter spindle body.
FIGURE 5 is a vertical sectional view similar to FIGURE 4, illustrating a record in a partially lowered position and showing the relative positions of the adapter spindle primary record support fingers when lowering the record and the secondary record support blades when supporting the stack of records while the lowermost record is being lowered to the turntable.
FIGURE 6 is a partial vertical sectional view taken substantially along the line 6—6 of FIGURE 7.

Referring now to FIGURES 3, 4 and 5, the lower adapter body portion 28 is provided with a generally cylindrical central bore or recess 34 which cooperates with a recess 36 provided in the upper adapter cap member 30 to form a cavity which receives the self-supporting center spindle 22 when the adapter spindle is mounted upon the center spindle. The upper end portion 37 of recess 36 in cap member 30 is preferably provided with a depending annular flange 38 which forms means to receive the upper end of the center spindle 22. The annular flange portion 38 cooperates with a depending stop or projection 40 formed in the cap member 30 to locate the record adapter spindle 20 in a fixed predetermined position relative to the center spindle 22 and over the turntable 24.

The lower end 41 of the lower adapter body portion 28 is provided with an aperture 42 which receives the center spindle 22 therethrough and fixedly locates the lower portion of the adapter body relative to the center spindle. A generally conical approach surface 44 is provided adjacent the aperture 42 to assist in guiding the center spindle 22 into the cavity 34 of the adapter spindle housing. The approach surface 44 also serves to displace the center spindle primary record support fingers 45 radially into the center spindle body 46 when the adapter spindle is mounted upon the center spindle, as will be more fully described hereinbelow.

Figure 8:
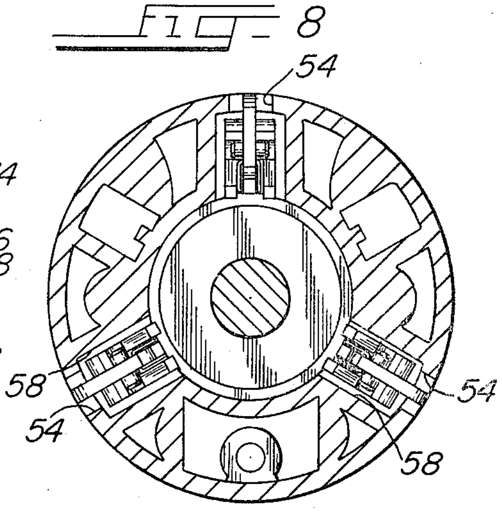
FIGURE 8 is a horizontal sectional view taken substantially along the line 8—8 of FIGURE 3 showing the primary record support fingers of the adapter disposed within the circumferentially spaced vertical slots in the adapter spindle body.

The lower adapter body portion 28 is provided with three longitudinally extending slots or openings 54 which are equidistantly spaced about the outer circumference of the adapter body. The openings 54 extend from the upper terminal end 55 of the lower body portion 28 downwardly to a point above the lower end 41 of the adapter body. The inside edges of the lower ends 56 of the openings 54 provide cam surface for displacing a plurality of adapter spindle record drop fingers 94 inwardly, as will be more fully described herein below. The slots or openings 54 extend radially inward (FIGURE 8) so as to intersect corresponding longitudinally extending radial slots 58 which have a greater circumferential width than their corresponding openings 54. The slots 58 extend from the upper terminal end 55 of the lower body portion 28 downwardly to the lower end 41 thereof and are circumferentially equidistantly spaced about the longitudinal axis of the adapter spindle body. Noting especially FIGURE 8, it will be seen that the slots 58 intersect both their corresponding openings 54 in the outer surface of the adapter body portion 28 and the central bore 34.

The openings 54, the slots 58, and central bore 34 together form a longitudinally extending channel which receives a large center hole record supporting and lowering means, indicated generally at reference numeral 70, for upward and downward sliding movement within the lower adapter body portion 28. With reference to FIGURES 3–5, taken in conjunction with FIGURE 11, the record supporting and lowering means 70 includes an annular shaped member 72 which serves as a support for primary record support fingers 94 as hereinafter described. The support member 72 has a central aperture 74 therein having a diameter slightly larger than that of the center spindle body 46 so as to be slidable thereover. Outwardly diverging conical surfaces 76 and 78 are provided on either side of the central aperture 74. The conical surface 76 intersects the bottom surface of the support member 72 and serves to guide the center spindle body 46 through the aperture 74 and displace the record support fingers 45 of the small center spindle radially inwardly when the support member 72 is mounted upon the center spindle. The upper conical surface 78 terminates in a generally diametrical recess 80 with a shoulder 82 being formed between the recess portion 80 and the conical surface 78. An annular plate or spacer member 84 having an outer diameter substantially equal to the diameter of recess 80 is received within the recess 80 and retained therein through staking over of the upper edge portion of the support member 72 adjacent the recess 80. The annular undersurface of the spacer member 84 provides a bearing surface which abuts the upper ends of the primary support fingers 45 for upward and downward movement therewith as will be more fully described hereinbelow. The spacer member 84 includes a central aperture 86 therein through which the center spindle body 46 passes when the adapter spindle 20 is mounted on the center spindle.

Support member 72 has a generally cylindrical outer surface 88 having a diameter slightly smaller than the diameter of bore 34 in the lower adapter body portion 28 so as to allow longitudinal sliding of support member 72 within the bore. Three sets of longitudinally extending ribs 90 are formed integral with or otherwise suitably secured to the cylindrical surface 88 of support member 72 and are equidistantly spaced about the circumference of surface 88 in a manner to be received within the longitudinally extending slots 58 in the lower adapter body portion 28. Each set of ribs 90 forms a longitudinally extending slot 92 which receives a primary record support finger 94 for radial movement therein. The outside width of each pair of rib members 90 is slightly less than the circumferential width of the corresponding slot 58 so as to be freely slidable therein upon upward or downward movement of the support member 72. The lower ends 96 of the ribs 90 are generally hook-shaped such that each set of ribs receives and supports a pivot pin 98 for rotational movement. Each pivot pin is secured to a primary record support finger 94 thus allowing the finger to rotate about the axis of pin 98. The terminal portions of the hook ends 96 of ribs 90 are staked over upon the pivot pins 98 so as to retain the pivot pins within their respective supporting ribs. It will be understood that the pivot pins 98 may be fixedly secured to the primary record support fingers 94 and rotatable within the hooked ends 96 of the ribs 90 or the pivot pins may be fixed to the hooked ends 96, with the fingers 94 being rotatably mounted upon the fixed pivot pins 98 for rotational movement about the pivot pin axes.

Noting FIGURES 3–5 and 11, biasing means are provided between the support member 72 and the record support fingers 94 to urge the fingers outwardly through the openings 54 in the adapter body portion 28. These biasing means comprise generally U-shaped springs 100 having closed end portions 102 thereof bent backwardly toward leg portions 104. The leg portions 104 (FIGURE 11) are spaced so as to be received within the slots 92 defined by rib members 90 while the closed end portions 102 abut corresponding fingers 94 adjacent shoulder portions 106 provided thereon so as to normally urge the fingers outwardly. FIGURE 16 illustrates an alternative embodiment of a spring means for urging the record support fingers outwardly. As shown, a flat leaf spring 101 includes a back portion 103 adapted to be received within said mentioned slot 92 in the support member 72. A forward portion 105 is bent generally downward and has a hooked end 107 which engages a record support finger adjacent the shoulder portion 106 thereof so as to urge the support finger outwardly in similar fashion to the above described springs 100.

Each of the primary record support fingers 94 has an upper support end portion 108. These end portions 108 combine to provide a supporting shelf to engage the lowermost record of a stack of large center hole records supported on the adapter spindle 20 when the fingers 94 are projected outwardly of openings 54 in the adapter spindle body. A generally arcuate outer edge surface 110 is provided on each of the fingers 94 which engage a corresponding cam surface 56 in the adapter body portion 28 upon downward movement of the finger support member 72 and thereby cams the support fingers 94 into the interior of the adapter spindle lower body portion 28 against the biasing force of spring members 100. An inwardly directed arm portion 112 is also provided on each of the record support fingers 94 to underlie the bottom end of annular support member 72 and abut the bottom surface when the fingers 94 are rotated outwardly of the adapter spindle body, thereby serving to limit such outward movement.

The upper ends of at least one pair of the longitudinally extending ribs 90 are also inclined downwardly when considering FIGURES 3–5 to form cam surfaces 114 which serve to retract an adapter spindle record support blade means when the finger support member 72 is in its uppermost record supporting position, as will be more fully described hereinbelow. Preferably, cam surfaces 114 are formed on the upper ends of each pair of ribs thereby allowing the finger support member 72 to be inserted into the bore 34 without having to selectively position the cammed end set of ribs into a particular slot 58.

FIGURE 15 illustrates an alternative embodiment of primary record support fingers which differ from the primary record support fingers 94 in that the means for biasing the finger outwardly is formed integral with the finger. As shown in said FIGURE 15, the primary record support fingers designated at 120 in this alternate construction has an aperture 122 therein to receive a pivot pin in similar fashion to the pivot pin 98 provided in fingers 94. Fingers 120 also have a record support end 124 and an arcuate cam surface 126 thereon similar, respectively, to end 108 and cam surface 110 of fingers 94. Fingers 120 are preferably made of a plastic material and have an extending resilient projection portion 128 formed integral therewith which extends outwardly and is angularly disposed to the main portion of the finger. It will be understood that when primary record support fingers of the type illustrated in FIGURE 15 are utilized in the adapter spindle 20 illustrated in FIGURES 3–5, fingers 120 will be supported upon the lower hooked ends 96 of ribs 90 in similar fashion to fingers 94. The extending portions 128 will be disposed between the rib members 90 and positioned against the cylindrical surface 88 of support member 72 to thereby bias the fingers 120 to outwardly extended positions through the openings 54.

In accordance with the present invention, the adapter spindle is also provided with secondary record supporting means which are shown as comprising a main support blade 130 and two auxiliary blades 131. These are disposed between the lower body portion 28 and the upper cap member 30 and are operable to support all but the lowermost record in a stack of records supported on the adapter spindle while the lowermost record is being lowered to the turntable for playing. Noting FIGURES 3–5, taken in conjunction with FIGURES 7 and 10, the main support blade 130 is received within a radially extending horizontal slot or recess 132 in the upper surface 55 of the adapter spindle lower body portion 28. With reference to FIGURES 11 and 12, the main support blade 130 comprises a generally flat member having a forward edge portion 136 adapted to be projected outwardly from the outer peripheral surface of the adapter spindle body to support records disposed on the adapter spindle above the plane of the main record support blade. The slot 132 has a width sufficient to slidably retain blade 130 and is located within the surface 55 such that the longitudinal axis of the slot lies in a vertical plane passing through the central axis of center spindle 22 and the radial centerline of one of the slots 58 in the adapter body portion 28. The record support blade 130 has a recess 138 therein to provide clearance for the center spindle 22 when the adapter spindle is disposed upon the self-supporting center spindle 22. The support blade 130 further includes a pair of vertically disposed portions 144 and 146 provided with axially aligned apertures 148 which rotatably support an actuating roller 150 such that the axis of the roller is disposed normal to the longitudinal axis of blade 130 and lies in a horizontal plane slightly raised from the plane of the support blade.

The main record support blade 130 is biased to an outward extended position by a pair of coil tension springs 152, each having one end suitably secured to an upstanding projection 154 on the upper surface 55 of the adapter spindle lower body portion 28 and the opposite end suitably secured to one of the vertically disposed portions 144 and 146 of the main support blade 130. It will be understood that when the adapter spindle 20 is mounted upon the self-supporting center spindle 22, coil springs 152 will be bowed somewhat about the center spindle 22, which bowing will not affect their tensioning function.

Noting FIGURES 3–5, the adapter spindle cap member 30 has a downwardly depending rib portion 160 having a radially extending recess 162 provided in the lower end thereof adjacent the upper surface 55 of the lower body portion 28. The radial length of recess 162 is defined by depending rib portions 164 and 166. When the adapter spindle 20 is assembled, the rib portions 164 and 166 project downwardly on either side of the roller 150. Depending rib portion 164 provides a stop means which limits the outward travel of the main support blade 130 caused by the outward biasing tension of the coil springs 152 while the record supporting and lowering means 70 is lowering a record to the turntable for playing.

Figure 7:
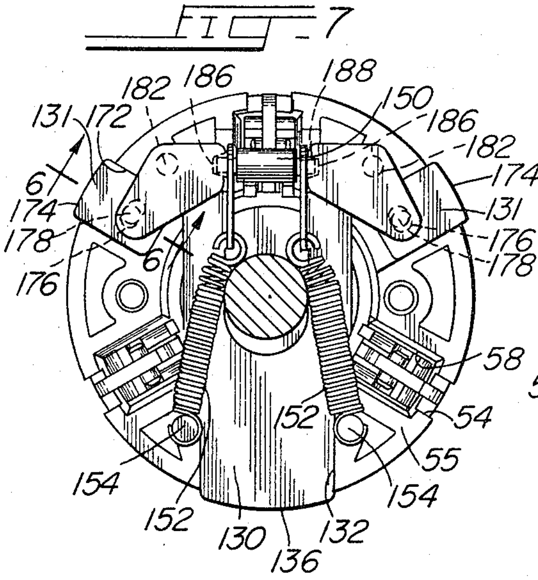
FIGURE 7 is a horizontal sectional view taken substantially along the lines 7—7 of FIGURE 3, showing the secondary record support blades in their extended record supporting positions.
Figure 10:
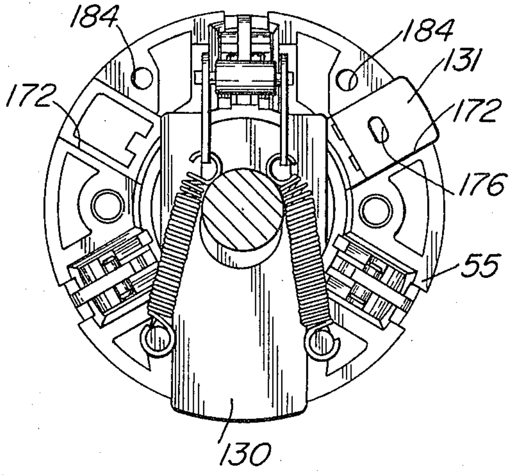
FIGURE 10 is a horizontal sectional view similar to FIGURE 7, but having the secondary record support blade actuators and one of the secondary support blades removed.

Referring now to FIGURES 6, 7 and 10, taken in conjunction with FIGURE 11, the auxiliary blades 131 of the secondary record support means are supported for radial sliding relation in a coresponding pair of radially extending slots 172 provided in the upper surface 55 of adapter spindle lower body portion 28 so as to be coplanar with the main record support blade 130. Slot 132 and slots 172 are circumferentially equidistantly spaced in surface 55 with slots 172 having a width sufficient to allow radial sliding of the secondary support blades 131 while preventing cocking or rotational movement of the blades when assembled within the solts. Each of the auxiliary support blades 131 has an outer edge portion 174 which is generally arcuate in plan view, the radius of the arc being substantially the same as the radius of the outer surface of the adapter spindle lower body portion 28. The auxiliary support blades 131 have a thickness equal to that of the main record support blade 130 and each has a generally elongated slot 176 therethrough adapted to receive a depending projection 178 provided on the bottom surface of an actuator 180 (see FIGURE 6). The slots 176 have a width, when considered radially from the central axis of the adapter spindle, slightly greater than the diameter of the depending projections 178, the major dimension of the slots being sufficient to allow sliding contact of the projections 178 within the slots 176 during outward and inward movement of the secondary record support blades 170, as will be more fully described hereinbelow.

Actuators 180 serve as connecting means between each auxiliary record support blade 131 and the main record support blade 130 so as to provide for simultaneous outward or inward radial movement of the auxiliary support blades 131 with a corresponding outward or inward movement of the main support blade 130. Each actuator 180 is rotatably supported upon the upper surface 55 of the adapter spindle lower body portion 28 by means of a depending pin 182 formed integral with or otherwise suitably secured to the bottom surface of the actuator. The pins 182 are rotatably received within recesses 184 formed in the upper surface 55 such that the axes of rotation of the actuators are radially equidistant from the longitudinal axis of center spindle 22. In the under surface of each actuator body is a recess 186 which receives an end projection 188 of the roller member 150 supported on the main support blade 130. The vertical side edge portions defining the slot 186 diverge outwardly from the inner end of the recess so as to allow rotational movement of the actuators 180 without binding when the main support blade 130 is moved outwardly.

Referring to FIGURE 7, it can be seen that outward extension or movement of the main support blade 130 therefore causes roller 150 to be moved outwardly therewith and the actuator members 180 to be rotated about their respective depending pins 182 through the roller ends 188. This effects a simultaneous outward movement of the record support blades 131 through the interconnection to the actuators 180. The geometry of each actuator 180 with respect to its pivot axis, its sliding connection with an auxiliary support blade 131 and its connection to the roller 150 is such as to cause blades 131 to be moved radially a distance equal to the radial movement of the main record support blade 130.

Figure 9:
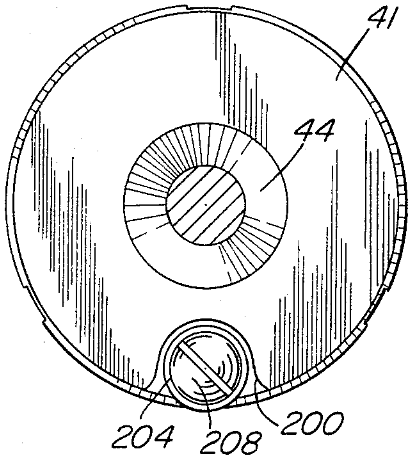
FIGURE 9 is a partial sectional view taken substantially along the line 9—9 of FIGURE 1 and showing the record centering roller disposed on the lower portion of the adapter spindle body.

Referring now to FIGURES 1 and 9 in conjunction with FIGURE 11, the adapter spindle lower body portion 28 is preferably tapered inwardly from the upper end 55 to the lower end 41 such that the lower peripheral surface of the adapter spindle will be spaced inwardly from the peripheral edges of the center holes of records R disposed on the turntable 24. A recess 200 is provided in the peripheral surface of the adapter lower body 28 and extends from the bottom end 41 vertically upward to a shoulder wall 202. The recess 200 serves to receive a cylindrical record centering roller 204 which is rotatably supported on a vertically extending pin or boss 206. The support pin 206 may be formed integral with or otherwise suitably secured to the shoulder wall 202 of the lower body 28 so as to depend downwardly therefrom parallel to the longitudinal axis of the adapter spindle. The support pin 206 is adapted to receive a screw means 208 in the bottom thereof with the head of screw 208 serving to retain the centering roller 204 in rotatable relation on the support pin 206. The centering roller 204 has a diameter less than half the radius of the adapter spindle body and is so located that its outer periphery is spaced from the center axis of the adapter spindle a distance corresponding to the radius of the center holes of the records or only slightly smaller so as to have line contact with the record center hole periphery. It will be understood that the length of the centering roller 204 and the vertical height of the recess 200 may be varied, it being desirable that they be of a vertical height sufficient to maintain their centering function after all of the records supported upon the adapter spindle have been lowered to the turntable 24.

Having thus described a preferred embodiment of the present invention, it will be readily seen that in assembling the elements comprising the adapter spindle 20, it is necessary that the finger support member 72 be positioned within the adapter body portion 28 such that a rib set 90 having upper cam surfaces 114 thereon underlies the actuating roller 150 of record support blade 130. As above noted, if each set of ribs 90 is provided with upper cam surfaces 114, such selective orientation during assembly will be unnecessary.

The operation of the above described adapter spindle 20 in cooperation with the self-supporting center spindle 22 is as follows. With particular reference to FIGURES 3, 4 and 5, FIGURE 4 illustrates the adapter spindle 20 mounted upon the self-supporting center spindle 22 with the center spindle primary support fingers 45 being shown in their normal upward at-rest positon. When the adapter spindle is mounted upon the self-supporting center spindle, the conical surface 44 of the adapter spindle lower body portion 28 and the conical surface 76 of the record drop finger supporting member 72 will respectively cam the primary record support fingers 45 to a position within the center spindle body 46 thereby allowing the adapter spindle to be mounted upon the center spindle. The upper end of center spindle 22 will be received within the upper cavity of the adapter spindle body defined by annular depending projection 38 and stop member 40. As the adapter spindle is mounted upon the self-supporting center spindle, the upper ends of the primary record support fingers 45 will engage the undersurface of spacer member 84 to maintain the finger support member 72 of the adapter in its raised position. The primary record fingers 94 thereof will be biased outwardly through corresponding openings 54 in the adapter spindle body portion 28 by springs 100 to support a stack of large center hole records R. In the raised position illustrated in FIGURE 4, the cam surfaces 114 on the upper ends of a pair of rib members 90 on the primary record support finger support member 72 will engage the actuating roller 150 to thereby urge the main record support blade 130 of the secondary record supporting means to an inward retracted position within the adapter spindle body against the tensioning force of coil springs 152. As previously described with reference to FIGURE 7, retraction of the main record support blade 130 through engagement of roller 150 with the cam surfaces 114 causes the auxiliary record supporting blades 131 to be simultaneously retracted so that none of the record support blades project outwardly of the adapter spindle body.

When it is desired to lower the lowermost record R′ of the stack of large center hole records R supported on the upper record storage portion of the adapter spindle to the turntable for playing, the record change cycle of the self-supporting centering spindle 22 will be actuated, either automatically or manually in a manner described in the afore-referenced copending application of Robert J. Hammond, Ser. No. 449,533, filed Apr. 20, 1965. During such a record change cycle, the primary record support fingers 45 of the center spindle 22 will be lowered, thereby lowering the finger support member 72 and its associated primary record support fingers 94. As the support member 72 is initially lowered, the cam surfaces 114 on the upper ends of the ribs 90 adjacent the roller 150 will disengage the roller, whereupon the tension springs 152 will urge the main record support blade 130 and the auxiliary support blades 131 of the secondary record supporting means to their respective outwardly extended positions intermediate the lowermost record and the remaining records in the record stack. The support member 72 will thereafter be lowered with its fingers 94 supporting the lowermost record R′. As the support member 72 approaches the bottom end 41 of the adapter body portion 28, its fingers 94 will be cammed inwardly through engagement of the outer edge portions 110 thereof with the inner edges of the lower ends 56 of the longitudinally extending openings 54 in the adapter spindle body portion 28. Retraction of the primary record support fingers 94 will thereby allow the lowermost record R′ to continue its downward movement to the turntable 24.

As the lowermost record R′ rests upon the turntable 24, it will be centered thereon relative to the center axis of the adapter spindle 20 through engagement of the peripheral edge portion of the record center hole with the outermost peripheral surface element of the record centering roller 204. The lower peripheral surface of the adapter spindle body portion 28, having a diameter less than that of the record center hole, will not engage the peripheral edge of the large center hole record, thus reducing frictional resistance to rotation of the record on the turntable.

After the lowermost record R′ has been lowered to the turntable 24 for playing, the primary record support fingers 45 of the self-supporting center spindle 22 again rise to their normal upward position, thereby effecting a simultaneous upward movement of the primary record support fingers 94 via support member 72. As the support member 72 approaches its uppermost position, the cam surfaces 114 on the upper ends of ribs 90 will again engage the roller 150 to thereby retract the main blade 130 and the auxiliary blades 131 of the secondary record supporting means to their respective retracted positions within the adapter spindle. Retraction of the record support blades allows the remaining records on the adapter spindle to be supported solely by the three fingers 94 comprising the primary record supporting means which have been biased to their outward record supporting positions by springs 100 as the finger support member 72 is raised to its uppermost position. The primary record supporting fingers 94 will thereafter support the stack of large center hole records preparatory to recycling the record change mechanism of the self-supporting spindle 22 to again lower the lowermost record of the stack to the turntable for playing.

Figure 14:
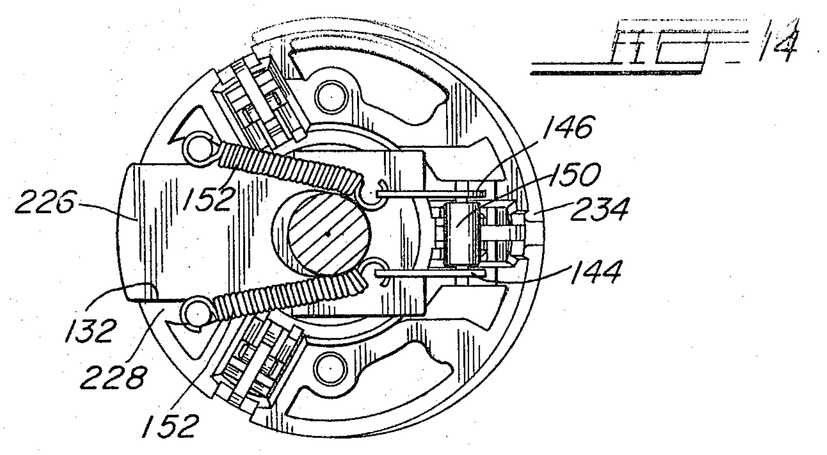
FIGURE 14 is a horizontal sectional view taken substantially along the lines 14—14 of FIGURE 13 with the records removed from the adapter spindle and the primary record support fingers in their retracted positions.
Figure 13:
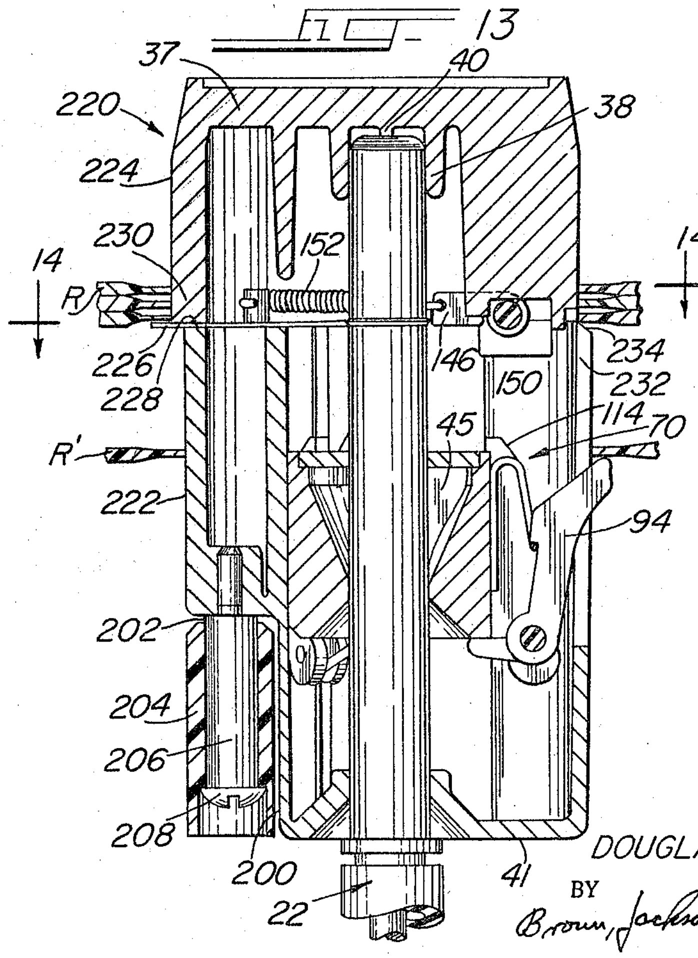
FIGURE 13 is a vertical sectional view similar to FIGURE 5, but illustrating a further embodiment of the present invention utilizing a single secondary record support blade member.

Referring now to FIGURES 13 and 14, there is shown an alternative embodiment of an adapter spindle in accordance with the present invention. The alternative embodiment is indicated generally by reference numeral 220 and is generally similar to the adapter spindle 20 illustrated in FIGURES 1–12. Adapter spindle 220 differs from adapter spindle 20 in that it employs secondary record supporting means comprising a single blade in cooperative association with the adapter spindle body to support all but the lowermost record in a record stack while the lowermost record is being lowered to the turntable for playing.

The adapter spindle 220 includes an adapter body having a lower portion 222 and an upper cap member 224 which may be suitably secured to the lower body portion 222 in a manner similar to that described above with reference to the cap member 30 of the adapter spindle 20. The adapter spindle 220 is adapted to be mounted on and supported by the mentioned small diameter self-supporting center spindle 22 in similar fashion to the mounting of the adapter spindle 20 as illustrated in FIGURE 3.

A single record support blade 226 is disposed between the lower body portion 222 and the upper cap member 224 of the adapter spindle body 220 for rectilinear radial movement in similar fashion to the mounting of the record support blade 130 above described. The record support blade 226 rotatably supports an actuating roller 150 through vertically disposed portions 144 and 146 and is urged to an outward extended position through coil tension springs 152. Support blade 226 is retained for radial movement in a slot 132 provided in the upper surface 228 of the lower body portion 222.

The outer diameters of the upper cap member 224 and the lower body portion 222 are substantially identical to the diameters of the lower body portion 28 and cap member 30 of the above described adapter spindle 20. The center axis of the upper cap member 224 is offset slightly from that of the lower body portion 222 thereby forming an overhanging portion 230 adjacent the slot 132 and the record support blade 226. By offsetting the upper cap member 224 relative to the lower body portion 222, a portion 232 of the lower body 222 is caused to project outwardly from the upper cap member 224 diametrically opposite the overhanging portion 230. The projecting portion 232 of the lower body 222 cooperates with the record support blade 226 to support all but the lowermost record of a record stack upon the upper cap member 224 while the lowermost record is being lowered to the turntable by a record supporting and lowering means 70 in similar fashion to that above described with respect to adapter spindle 20. It will be understood that by offsetting the upper cap member 224 relative to the lower body portion 222, the annular wall 38 will have to be located within the cap member such that it is axially aligned with the center spindle 22 for proper cooperation therewith.

Preferably the projecting portion 232 is provided with an inclined upper surface 234 to assist the lowermost record R′ in passing from the upper cap member 224 onto the lower body portion 222 during a record changing cycle. It has been found that an included angle of 30° relative to the horizontal provides an angle of incline which greatly assists in the lowering of the lowermost record while also serving to cooperate with the record support finger 226 to support all but the lowermost record as above described.

In operation, the adapter spindle 220 receives a plurality of large center hole records R on the upper storage area of cap member 224. The records are supported by the fingers 94 which comprise the primary record supporting means when in their upper record supporting positions as was described with respect to FIGURE 4. When the record supporting and lowering means 70 is in its uppermost position, the record support blade 226 will be retracted to a position within the upper cap member 224 through engagement of the cam surfaces 114 of record supporting means 70 with roller 150.

Initiation of a record change cycle causes the record supporting and lowering means 70 to be lowered whereupon the record support blade 226 will be urged outwardly by tension springs 152 to engage the underside of the next to lowermost record in the stack. As the fingers 94 move downwardly to lower the lowermost record R′ to the turntable, the extended record support blade 226 and the upper surface 234 of the projecting portion 232 of the lower body member 222 support the remaining records R on the upper cap member 224. After lowering the lowermost record R′ to the turntable, the record supporting and lowering means 70 is returned to its uppermost position wherein the record support blade 226 will again be retracted to allow the records R to again be supported solely by the fingers 94 preparatory to a subsequent record changing cycle.

Thus, by offsetting the upper cap member 224 relative to the lower body portion 222 in the adapter spindle 220, the offset portion 232 of the lower body portion 222 cooperates with the supporting blade 226 to support the records R during a record change cycle, thereby eliminating the need for a plurality of record supporting blades.

While preferred embodiments of my invention have been shown and described, it will be obvious to those skilled in the art that changes and modifications may be made therein without departing from the invention in its broader aspects.

I claim:

1. An adapter spindle for a record player having a center spindle adapted for supporting a plurality of small diameter center hole records and including vertically movable means for lowering one record at a time to a turntable during a record change cycle for playing, said adapter spindle comprising, in combination, an adapter body adapted to be mounted on and centered by the center spindle, support means mounted within said adapter body and cooperatively associated with the vertically movable means of the center spindle for movement therewith, a plurality of primary record support fingers mounted on said support means, said adapter body having first openings therethrough, said fingers being adapted to extend outwardly of said adapter body through said first openings for supporting a plurality of large center hole records on said adapter body and lowering the lowermost record to the turntable for playing, said adapter body having further openings above said fingers, and secondary record support blade means supported by said adapter body for rectilinear horizontal sliding movement in said further openings, said record support blade means being adapted for movement to a first position for supporting all but the lowermost record of the records disposed on said adapter body, and to a second position wherein said support blade means is not supporting said large center hole records, means for moving said record support blade means to said first position, and said finger support means including means for moving said record support blade means to said second position.

2. An adapter spindle as defined in claim 1 wherein said means for moving said record support blade means to said second position engages said record support blade means when said finger support means is moved toward its uppermost position to effect movement of said blade means to said second position wherein said blade means is not supporting the records disposed on said adapter body.

3. An adapter spindle as defined in claim 1 wherein said record support blade means includes a single blade member mounted for horizontal reciprocal movement in said adapter body, and an actuating roller supported by said blade member, and said means for moving said record support blade means to said second position effects movement of said blade member and said actuating roller to a position wherein said blade member is not supporting the records disposed on the adapter body, when said support means is moved toward its uppermost position.

4. An adapter spindle as defined in claim 3, wherein said means for moving said record support blade means to said first position includes means to urge said blade member to a position wherein it extends outwardly of said spindle body to support all but the lowermost record of the records disposed on said adapter spindle when said support means is moved downwardly from its uppermost position within said adapter spindle.

5. An adapter spindle as defined in claim 3 wherein said adapter body includes a portion thereon to assist said blade member in supporting records on said adapter body when said fingers are lowering the lowermost record to the turntable for playing.

6. An adapter spindle as defined in claim 5 wherein said adapter body includes a lower body portion and an upper cap member, said upper cap member being offset relative to said lower body portion so as to form said portion to assist said blade member in supporting records on said upper cap member when said fingers are lowering the lowermost record to the turntable for playing.

7. An adapter spindle as defined in claim 1 wherein said adapter spindle body is relieved at its lower portion so as to be spaced from the peripheral edges of the center holes of the large center hole records when lowered to the turntable, and including record-centering means disposed on the lower portion of said adapter body to engage the peripheral edge portions of the record center holes and thereby center the records on the turntable during playing.

8. An adapter spindle as defined in claim 1 wherein said support blade means comprises a plurality of record support blade members mounted in said adapter body for horizontal radial movement therein, one of said blade members having means thereon for engaging said means for moving said record support blade means to said second position when said finger support means is moved toward its uppermost position to thereby retract said one of said support blade members to a position within said adapter body, and including means interconnecting said one of said support blade members and the other support blade members of said plurality of blade members so as to effect simultaneous movement of said blade members to extended or retracted positions, and wherein said means for moving said record support blade means to said first position includes means for urging said blade members to their extended positions wherein they support all but the lowermost record of the records disposed on said adapter body when said support fingers are lowering the lowermost record to the turntable for playing.

9. An adapter spindle as defined in claim 8 wherein said means interconnecting said one of said record support blade members and said other support blade members includes a plurality of bell crank lever members rotatably mounted within said adapter housing, each of said bell crank lever members being pivotally connected to said one of said support blade members and one of said other support blade members whereby outward or inward movement of said one of said support blades effects a simultaneous corresponding movement of said other support blade members.

10. An adapter spindle as defined in claim 9 wherein said other blade members comprise a pair of record support blades disposed in coplanar relation to said one of said blade members, said one of said blade members and said pair of support blades being disposed in equidistant circumferentially spaced relation about the longitudinal axis of said adapter spindle.

11. An adapter spindle as defined in claim 8 wherein said adapter body includes means for limiting the outward movement of said one of said support blade members.

12. An adapter spindle as defined in claim 8 wherein said means for moving said record support blade means to said second position comprises a cam surface on finger support means, said cam surface being positioned to engage said engaging means on said one of said support blade members to thereby urge said one of said blade members to a retracted position within said adapter body when said finger support means is moved toward its uppermost position.

13. An adapter spindle as defined in claim 1 wherein said adapter body includes a recess therein to receive the center spindle in supporting relation, said recess opening into the bottom surface of said adapter body and terminating in an upper end portion of said body, said upper end portion serving to position said adapter spindle relative to the turntable.

14. An adapter spindle as defined in claim 1 wherein said further openings in said adapter body include a plurality of horizontal radially extending slots, and wherein said record support blade means comprises a plurality of record support blades, said support blades each being received within a respective one of said radial slots such that said support blades are slidably movable radially within corresponding slots to a position extending outwardly of said adapter body for supporting all but the lowermost record of a stack of records disposed on said adapter body, and to a position within said adapter body wherein said support blades are not supporting the records disposed upon said adapter spindle.

15. An adapter spindle as defined in claim 1 wherein said first openings in said adapter body include a plurality of longitudinally extending slots, said record support fingers each being aligned with a respective one of said longitudinally extending slots in said adapter body such that they normally project outwardly through said slots to support a plurality of large center hole records on said adapter spindle.

16. An adapter spindle as defined in claim 1 wherein said adapter body includes a longitudinally extending bore to receive said finger support means in sliding relation therein, said finger support means comprising a generally annular member having a central aperture to receive the center spindle therethrough and a plurality of vertically extending ribs circumferentially spaced about said annular member defining a plurality of vertically extending circumferentially spaced slots, each said slots serving to receive a corresponding one of said record support fingers, said finger support means further including means for engaging the vertically movable means of the center spindle whereby said finger support means will be moved vertically corresponding to movement of the vertically moveable record lowering means of the center spindle during a record change cycle.

17. An adapter spindle as defined in claim 16 wherein said first openings in said adapter body comprise longitudinally extending slots which intersect said bore and the outer peripheral surface of said adapter body, said adapter body slots each serving to receive one of said record support fingers therein to allow projection of said fingers outwardly of said adapter body, and spring means for urging said fingers outwardly through said adapter body slots during a portion of the upward and downward movement of said finger support means.

18. An adapter spindle for a record player having a center spindle adapted for supporting a plurality of small diameter center hole records and including vertically movable means for lowering one record at a time to a turntable during a record change cycle for playing, said adapter spindle comprising, in combination, an adapter body adapted to be mounted on and centered by the center spindle, a primary record supporting means cooperatively associated with said adapter body and the vertically movable means for supporting a stack of large center hole records on said adapter body when the movable means is in its upper position and for releasing the lowermost record of the record stack when the vertically movable means is lowered during a record change cycle, openings in said adapter body above said primary record supporting means, secondary record supporting means disposed above said primary record supporting means comprising a plurality of blade members adapted for rectilinear horizontal sliding movement between extended positions projecting exteriorly of said adapter body through said openings to support all but the lowermost record of the record stack and retracted positions within said adapter body, and means cooperatively associated with said secondary record supporting means to effect movement of said blade members to said extended positions when said primary record supporting means releases the lowermost record, said primary record supporting means having actuating means to effect movement of said blade members to said retracted positions when said primary record support means is again in a position to support the record stack.

19. An adapted spindle as defined in claim 18 including a plurality of lever members supported by said adapter body for pivotal movement about vertical axes, each of said lever members being interconnected between two of said blade members such that movement of one of said blade members will effect a corresponding simultaneous movement of the remaining blade members.

20. An adapter spindle as defined in claim 18 wherein said actuating means comprises an abutment, and wherein one of said blade members includes means for engaging said abutment to effect movement of said blade members to said retracted positions.

References Cited

UNITED STATES PATENTS 3,352,561 11/1967 Arent ---------------- 274—10

LEONARD FORMAN, *Primary Examiner.*

J. M. FREED, *Assistant Examiner.*